Figure 1:
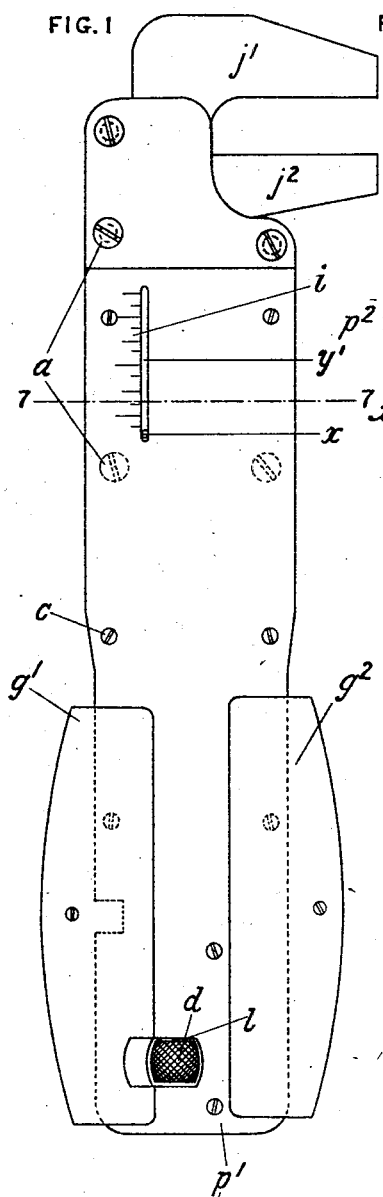

Sept. 24, 1929.  W. F. SPEAR  1,729,556

ADJUSTABLE SPANNER OR WRENCH

Filed July 20, 1927

William Forbes Spear
Inventor

Patented Sept. 24, 1929

1,729,556

UNITED STATES PATENT OFFICE

WILLIAM FORBES SPEAR, OF HARPENDEN, ENGLAND

ADJUSTABLE SPANNER OR WRENCH

Application filed July 20, 1927, Serial No. 207,302, and in Great Britain February 21, 1927.

This invention relates to improvements in adjustable spanners or wrenches of the type in which the adjustment to the nut is effected by relative sliding movement of the two jaws.

The objects of this invention are stated in the following four paragraphs (1) to (4):—

(1) The first object is to ensure absolute contact between the nut and the two jaws of the spanner under all the conditions of its application, including those in which owing to errors of workmanship the distances between pairs of opposite faces of the nut are not exactly equal, and notwithstanding any backlash in the adjusting mechanisms of the jaws, whether due to wear or to clearances necessarily provided in those mechanisms.

(2) The second object is to achieve Object No. 1 by the exertion of a force which is automatically included in and forms an inconsiderable part of that needed to use the spanner with one hand, and without requiring any supplementary action of the fingers, or of the other hand, in actuating pushes, screws, springs, or the like, for the purpose of the exact adjustment of the jaws, or for maintaining that adjustment, or for breaking the contact with one pair of the faces of the nut when it is desired to apply the spanner to another pair of faces, in the act of tightening or loosening a nut.

(3) The third object is to enable the spanner to be adjusted independently of, and without its preliminary application to, any given nut within the range of the spanner's designed capacity, by means of the attachment of a graduated scale whereby the spanner may be so adjusted for any particular system or systems of dimensioning or otherwise identifying nuts.

(4) In view of the mechanism employed in this invention it is a further object to arrange the working parts in such a manner that they shall be fully protected from damage and from wear and tear other than that necessarily arising in the various motions of the parts, and also to secure that the mechanism shall be kept constantly and effectively lubricated, in a manner which will minimize the risk of soiling the hands of the user.

It is not an object of this invention to apply the mechanical advantage of the wedge for the purpose of transforming the pressure of the hand-grip into positive pressure on the faces of the nut in order to grip the latter. What is aimed at is to adjust the jaws into the same positions as would be secured by using a perfectly fitting solid spanner, and to take advantage of the fact that owing to the actual mechanical properties of the double wedge a powerful thrust along the axis of the inner jaw ($j^2$ in the drawings accompanying this specification) may be prevented, by small transverse forces applied to the wedges, from causing sliding motion on the faces of the wedges which are in contact, and consequently movement of the jaw $j^2$ is easily resisted.

In order to achieve the objects specified above, two independent jaws are used, both of which are independently adjustable, and these jaws are carried in a frame. One jaw is adjustable, through the whole range of sizes of nuts for which the spanner is made, by means of screw and nut mechanism; the other jaw has only a small range of adjustability, and adjustment throughout that range is effected by means of a pair of equiangular co-operating wedges sliding in contact, both wedges sliding transversely to the axis of this jaw and one of them sliding also longitudinally, the inner extremity of the jaw bearing at right angles on that wedge which has both transverse and longitudinal sliding motion. The two wedges are connected respectively to a pair of sliding handgrips of ⊐-shaped form, within which the wedges occupy a central position both transversely and longitudinally. The frame is enclosed by cover-plates which besides enclosing and protecting the mechanism serve as guides to the sliding handgrips and to the wedges. Springs restore the mechanism to its initial position whenever the grasp of the hand is relaxed, and give automatically the slight clearance needed to enable the spanner to be removed from one pair of flats of a nut and applied to another pair. A scale enables the outer jaw to be adjusted approximately to the required opening without applying the spanner to the nut.

The invention is illustrated by one sheet of drawings accompanying this application. These drawings show the mechanical principles and the nature of the parts of this invention. They are not intended to represent exactly either the dimensions or the proportions of the several parts, nor, for example, the precise angle of the wedges $w^1$, $w^2$, all of which, within limits, may vary according to the size of the spanner and other considerations; neither is the precise form of the springs and of the screws or other fastenings necessarily limited to what is shown in the drawings. Further, the part formed of one half-frame and its cover-plate may, if desired, be produced from one solid piece by milling or other process. It is, however, an essential feature of the two wedges that they shall be equi-angular and shall be so paired and disposed in relation to the jaw $j^2$ and the frame of the spanner that the inner end of that jaw shall bear perpendicularly upon one face of one wedge and that the thrust of that jaw shall be thus transmitted to the contact faces of the wedges.

Figure 3:
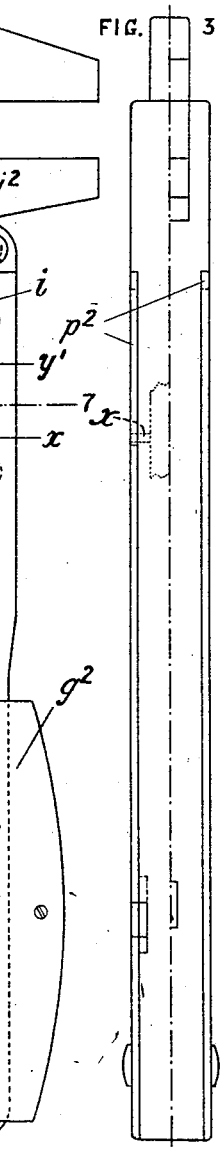
Figure 4:
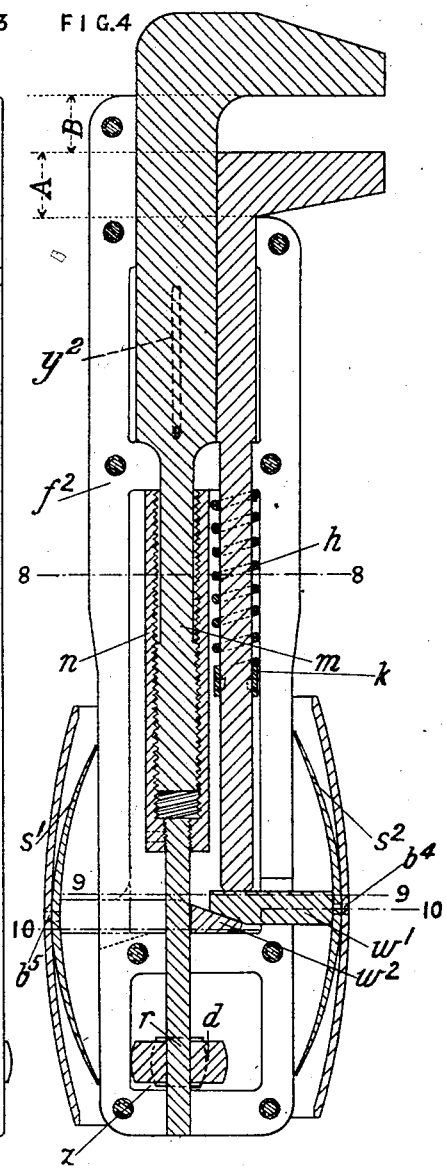
Figure 2:
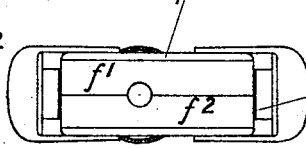
Figure 5:
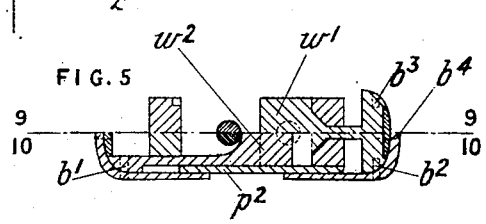
Figure 6:
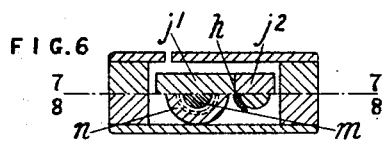

Referring to the sheet of illustrations, Figure 1 is a plan view of the spanner complete, and Figure 2 is an elevation of the lower end thereof. The left-hand side of Figure 3 is an elevation of the left side of the half-spanner shown in Figure 4, and the right-hand side of Figure 3 is an elevation of the right side of the half-spanner shown in Figure 4; in both these elevations the hand-grips ($g^1$, $g^2$) the springs ($s^1$, $s^2$) and the wedges ($w^1$, $w^2$) are not shown. Figure 4 is a sectional plan through the plane of contact of the two halves $f^1$ and $f^2$ of the frame. The lower half of Figure 5 is a cross section of Figure 4 on the line 10—10, and the upper half of Figure 5 is a parallel cross section of the upper half of the wedge $w^1$ and the half frame $f^1$ on the line 9—9. The upper half of Figure 6 is a half cross section of Figure 1 on the line 7—7, and the lower half of Figure 6 is a cross section of Figure 4 taken on the line 8—8.

The frame of the spanner, which carries the two jaws $j^1$ and $j^2$ and the adjusting mechanism, and to which are transmitted the stresses arising from the reaction of the nut when the spanner is in use, is made in the spanner illustrated from two flat bars $f^1$ and $f^2$ of equal thickness which are screwed or riveted together at several points (for example at $a$ in Fig. 1). Identical portions of these two bars are cut away so that when united the remaining portions form a framework of longitudinal and transverse bars. In the two halves ($f^1$ and $f^2$) of the frame similar slots or grooves are cut in two of the transverse bars on those faces which are to be in contact, so that when $f^1$ and $f^2$ are fastened together slots are formed in which the jaws $j^1$ and $j^2$ can slide longitudinally. Bearings for the spindle $r$ are formed, in other two transverse bars, in a similar manner.

The end $m$ of the shank of jaw $j^1$ has a screw thread cut upon it, and this threaded portion engages with a cylindrical nut $n$, which abuts against a cross bar of the frame. The spindle $r$ is screwed into and secured by a grub screw in, or is formed in one piece with, the nut $n$, and is provided with a disk $d$ formed in one piece with or rigidly fastened to $r$; so that rotation of the disk $d$ causes inward or outward motion of jaw $j^1$. The frame of the spanner is covered in by the cover-plates $p^1$ and $p^2$ which are secured to the frame at various points by screws (as at $c$), thus enclosing the adjusting mechanism of the spanner both for protection and to assist in the maintenance of good lubrication. These cover-plates may extend over the whole of the frame or (as shown in Figs. 1 and 3) over part of it. A slot $l$ is cut in each plate, through which the disk $d$ protrudes sufficiently, and with just sufficient clearance, to enable $d$ to be gripped by the fingers and rotated.

The two transverse wedge-pieces $w^1$ and $w^2$, which are placed as shown in Figs. 4 and 5, have equi-angular wedges at their inner ends. The remaining portion of wedge-piece $w^1$ is reduced in section over part of its length to enable it to pass through the frame, and the end outside the frame is formed to fit the inner surface of the hand-grip $g^2$, to which it is attached by screws as at $b^2$ and $b^3$. The remaining portion of the other wedge-piece $w^2$ is slotted longitudinally, thus forming two prongs which pass through slots in the frame on that side, their ends being formed to fit the inner surface of hand-grip $g^1$, to which they are attached by screws, as at $b^1$. The slot in wedge-piece $w^2$ allows of the spindle $r$ passing through the wedge-piece without interfering with the desired sliding motion of the latter. The hand-grips $g^1$ and $g^2$, which are of the cross section indicated by Fig. 5, slide on the cover-plates $p^1$, $p^2$, on each side of the frame of the spanner. The wedge $w^1$ slides on two sides between the two cover-plates and on a third side against the end of the shank of jaw $j^2$, two sides of wedge $w^2$ slide on the inner sides of the cover-plates, and a third side slides on the adjacent transverse bar. The inclined faces of the two wedges slide in contact. The shank of the jaw $j^2$ has attached a collar $k$. Between this collar and the transverse bar on the side remote from wedge $w^1$ a coil spring $h$ in compression surrounds the shank, so that when the spanner is not in use the jaw $j^2$ is maintained in its extreme "in" position, with the end of the shank in contact with $w^1$. In the space between the curved portion of each hand-grip and the side of the frame a leaf spring ($s^1$, $s^2$) is placed, which is fastened by a screw ($b^5$, $b^4$) at its middle to the hand-grip. The two ends of each spring rest on the side of the frame and slide thereon when the hand-grips are forced towards each other by the grasp of the hand in using the spanner. A small stud $x$ is fixed in jaw $j^1$, passing through that jaw and projecting on each side thereof. The ends of this stud travel in two slots ($y^1$, $y^2$) in the cover-plates. At any or all of the four edges of the two slots scales are engraved on the cover-plates. One such scale ($i$) is shown in Figure 1. An index mark on each end of the stud reads against the scales.

Having regard to the methods of construction by which the objects of this invention are achieved, it is desirable (or may be desirable in manufacturing spanners adapted to certain ranges of nuts) to reduce the dimensions and the range of travel of the outer jaw as much as possible. Reduction in dimensions without diminishing the factor of safety of the jaw is effected by prolonging that portion of the frame which provides the bearing surfaces for the outer jaw beyond that portion of the frame which provides the bearing surfaces for the inner jaw, as shown in Figures 1 and 4. The extent of this prolongation is the sum of the distances A and B in Fig. 4, being respectively the depth of the inner jaw and the distance across flats of the smallest nut for which the spanner is intended to be used; and the adjusting mechanism of the outer jaw is so constructed that the jaws cannot be brought closer together than the distance B. It is to be observed that any adjustable spanner which is capable of being used for nuts of screws of, say, three-fourths of an inch or more diameter is unsuitable for application to nuts of screws of less than, say, three-sixteenths of an inch diameter, and no useful purpose is served by making the jaws capable of closure to a smaller gap than corresponds to a three-sixteenths-inch nut, or whatever other minimum may be appropriate to the size of the spanner. The unsuitability referred to is accentuated in the case of a spanner such as is described in this specification, in which a definite grip of the hand is needed to actuate the mechanism of the fine adjustment and is applied at a leverage which is practically constant. If the spanner is of a size adapted to deal with a range of small nuts the portion B of the total prolongation in question may be dispensed with, and the jaws will then close completely in the ordinary manner, the salient angle at the corner of the inner jaw being rounded to correspond with the re-entrant angle of the outer jaw.

The action of the spanner in use is as follows:—The opening of the jaws is varied to suit approximately the size of the nut by rotating the female screw $n$ by means of the knurled disk $d$. This preliminary adjustment of the outer jaw $j^1$ may be done either by the usual method of applying the spanner to the nut and leaving a suitable small clearance, or by traversing jaw $j^1$ (by rotation of $d$) until the pointer on the stud $x$ is opposite a mark on the scale, corresponding to the size of nut in question. In either case the spanner is held in such a manner as not to cause motion of the wedges $w^1$ and $w^2$. When this adjustment has been made, the spanner is applied to the nut and the hand-grips $g^1$ and $g^2$ are grasped with sufficient force to move the wedges $w^1$ and $w^2$ inwards and force the inner jaw $j^2$ outwards until the clearance has been completely taken up and the nut is firmly enclosed between the jaws, when the further force necessary to rotate the nut is applied. After each turn the grasp of the hand is relaxed, and the spring $h$ (which abuts against the set collar $k$) and springs $s^1$ and $s^2$ restore the clearance by forcing the inner jaw inwards and returning the wedges to their original positions; whereupon the operation is repeated on another pair of faces of the nut.

Provision for more rapid adjustment of the outer jaw may be made by cutting longitudinal slots in the female screw $n$ and corresponding grooves in the male screw $m$, so that a turn of the disk $d$ through a certain sector will cause disengagement of the threads and allow the outer jaw to slide freely in or out. In this case a spring washer may be inserted in the space $z$, or a coil spring on the spindle $r$ may be inserted on the other side of $d$ between it and the cross bar of the frame, to facilitate control of the slight sliding motion of the spindle needed to enable the threads to re-engage if they happen to be in opposition after the jaw has been slid in or out with $m$ and $n$ disengaged, which sliding motion of the spindle is permitted by making the slot $l$ slightly wider in this case.

The graduations ($i$) on the edge or edges of the slot $y$ are arranged on the following principle:—The scale division corresponding to any given size of nut is so placed that when the index mark or pointer on the outer jaw is adjusted to that division the inner jaw has to be moved through some convenient fraction (say about one-half) of its possible range of motion in order to bring the two jaws into close contact with the nut. This provides for all the contingencies specified in the statement of the first object of this invention, the range of motion of the inner jaw being made at least twice as great as any clearance actually needed to enable the jaws to be applied to the nut or removed from it.

Throughout this specification the word "nut" is intended to include bolt-head and screw-head and other articles having a pair or pairs of normally parallel faces to which a spanner can be applied for the purpose of causing rotation.

Where surfaces of components of the spanner are in sliding contact for purposes of guidance, a portion or portions of one such surface are recessed to the extent of a few thousandths of an inch wherever desirable, for the purpose of retaining a film of lubricant and distributing this lubricant by the sliding motion. Examples of such places are the surface of contact of one jaw with the other, the undersides of those portions of the hand-grips which slide over the outer surfaces of the cover-plates, and the sides of the two wedges which slide over the inner surfaces of the cover-plates.

I claim:

1. A spanner or wrench consisting of a frame or body carrying jaws which are indepently adjustable, the coarse adjustment of one (the outer) jaw being effected by screw mechanism and the fine adjustment of the other (the inner) jaw by means of two equi-angular wedges, one of which slides transversely to the jaws and the other slides both transversely and longitudinally, the wedges being caused to slide in contact in opposite directions by two sliding hand-grips to which they are respectively attached, and being so disposed in relation to the inner jaw that one wedge thrusts that jaw towards the outer jaw when the hand-grips are grasped in order to use the spanner, and the inner jaw, the wedges and the hand-grips are returned to their initial positions by the action of springs when the grasp of the user's hand is relaxed, all substantially as set forth.

2. The combination, in a spanner or wrench, of a frame or body formed of two halves and having the portion which provides the bearing surfaces for the outer jaw prolonged beyond the portion which provides the bearing surfaces for the inner jaw, two independent adjustable and independently adjustable jaws carried therein, screw mechanism for adjusting one of these jaws, a pair of equi-angular wedges sliding in contact, one of them sliding transversely to the jaws and the other both transversely and longitudinally, two hand-grips sliding on the body of the spanner on opposite sides thereof and connected with the aforesaid wedges, springs for returning the inner jaw and the hand-grips and wedges to their initial positions, and a scale and pointer applied to the outer jaw, all substantially as described.

WILLIAM FORBES SPEAR.